US012564149B1

(12) United States Patent
Oliva et al.

(10) Patent No.: US 12,564,149 B1
(45) Date of Patent: Mar. 3, 2026

(54) HOST DEVICE TO ENABLE FASTER AND MORE PROLIFIC PLANT GROWTH

(71) Applicants: Jared-Patrick Soler Oliva, San Jose, CA (US); William Tyler Starr, Milpitas, CA (US)

(72) Inventors: Jared-Patrick Soler Oliva, San Jose, CA (US); William Tyler Starr, Milpitas, CA (US)

( * ) Notice: Subject to any disclaimer, the term of this patent is extended or adjusted under 35 U.S.C. 154(b) by 0 days.

(21) Appl. No.: 18/765,170

(22) Filed: Jul. 5, 2024

Related U.S. Application Data

(60) Provisional application No. 63/527,754, filed on Jul. 19, 2023.

(51) Int. Cl.
A01G 33/00 (2006.01)

(52) U.S. Cl.
CPC .................................... A01G 33/00 (2013.01)

(58) Field of Classification Search
CPC .. A01G 33/00; A01G 24/00–60; A01G 31/00; A01G 31/024; A01G 47/64; C12M 21/02; C12N 1/12–125; A01H 4/001
USPC ................ 47/1.4; 435/257.1–257.6; 800/296
See application file for complete search history.

(56) References Cited

U.S. PATENT DOCUMENTS

| | | | | |
|---|---|---|---|---|
| 5,345,713 | A * | 9/1994 | Molnar .................. | A01C 1/044 |
| | | | | 47/56 |
| 11,274,443 | B1 * | 3/2022 | Witt ...................... | E02D 29/025 |
| 2011/0073542 | A1 * | 3/2011 | Adey ..................... | C12M 25/14 |
| | | | | 47/1.4 |
| 2012/0018373 | A1 * | 1/2012 | Jones ..................... | A01G 33/00 |
| | | | | 428/92 |
| 2023/0263118 | A1 * | 8/2023 | Clough .................. | A01G 33/00 |
| | | | | 47/1.4 |

FOREIGN PATENT DOCUMENTS

DE          202022001528 U1 *   8/2022   ............. A01G 24/00

OTHER PUBLICATIONS

DE-202022001528-U1_MACHINE_TRANSLATION (Year: 2022).*

* cited by examiner

*Primary Examiner* — David J Parsley
*Assistant Examiner* — Sahar Almatrahi
(74) *Attorney, Agent, or Firm* — Plager Schack LLP; Mark H. Plager; Kara K. Verryt

(57) ABSTRACT

A host device for macroalgae cultivation that may replace the infection-susceptible dead cell core of aggregate form macroalgae may include a kernel comprising a lightweight, porous, and non-toxic material; a plurality of loops and pores on an outer surface of the kernel; and macroalgae filaments woven into the plurality of loops and pores.

6 Claims, 2 Drawing Sheets

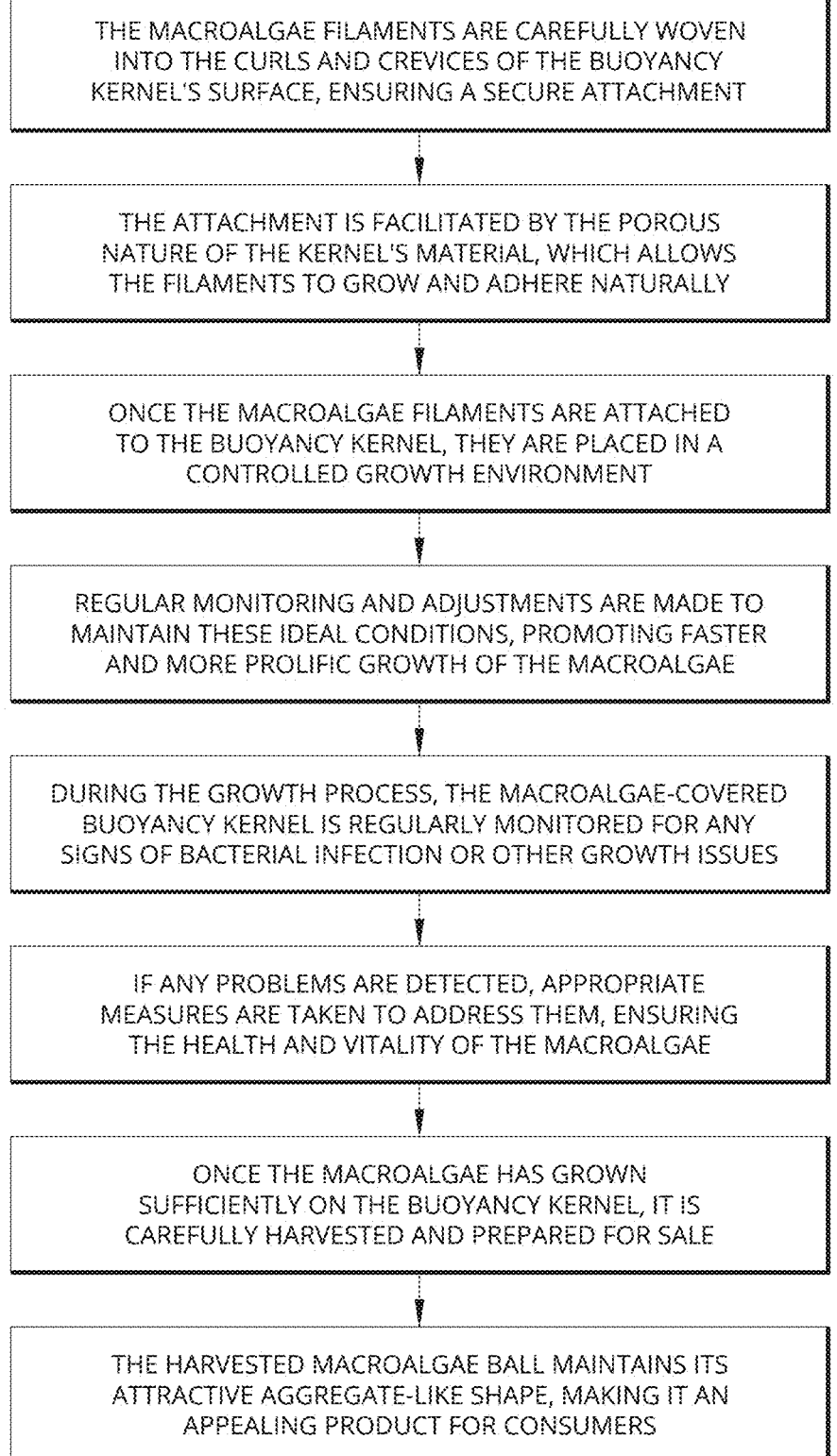

THE MACROALGAE FILAMENTS ARE CAREFULLY WOVEN INTO THE CURLS AND CREVICES OF THE BUOYANCY KERNEL'S SURFACE, ENSURING A SECURE ATTACHMENT

THE ATTACHMENT IS FACILITATED BY THE POROUS NATURE OF THE KERNEL'S MATERIAL, WHICH ALLOWS THE FILAMENTS TO GROW AND ADHERE NATURALLY

ONCE THE MACROALGAE FILAMENTS ARE ATTACHED TO THE BUOYANCY KERNEL, THEY ARE PLACED IN A CONTROLLED GROWTH ENVIRONMENT

REGULAR MONITORING AND ADJUSTMENTS ARE MADE TO MAINTAIN THESE IDEAL CONDITIONS, PROMOTING FASTER AND MORE PROLIFIC GROWTH OF THE MACROALGAE

DURING THE GROWTH PROCESS, THE MACROALGAE-COVERED BUOYANCY KERNEL IS REGULARLY MONITORED FOR ANY SIGNS OF BACTERIAL INFECTION OR OTHER GROWTH ISSUES

IF ANY PROBLEMS ARE DETECTED, APPROPRIATE MEASURES ARE TAKEN TO ADDRESS THEM, ENSURING THE HEALTH AND VITALITY OF THE MACROALGAE

ONCE THE MACROALGAE HAS GROWN SUFFICIENTLY ON THE BUOYANCY KERNEL, IT IS CAREFULLY HARVESTED AND PREPARED FOR SALE

THE HARVESTED MACROALGAE BALL MAINTAINS ITS ATTRACTIVE AGGREGATE-LIKE SHAPE, MAKING IT AN APPEALING PRODUCT FOR CONSUMERS

FIG.2

HOST DEVICE TO ENABLE FASTER AND MORE PROLIFIC PLANT GROWTH

RELATED APPLICATION

This application claims priority to provisional patent application U.S. Ser. No. 63/527,754 filed on Jul. 19, 2023, the entire contents of which is herein incorporated by reference.

BACKGROUND

The embodiments described herein relate generally to houseplants and, more particularly, to a host device that replaces the infection-susceptible dead cell core of aggregate form macroalgae to enable faster and more prolific plant growth.

Macroalgae in its aggregate ball form as a houseplant is limited due to its slow growth rate and susceptibility to bacterial infection. Moreover, the core of aggregate form of naturally derived macroalgae tends to be an infection-susceptible dead cell core. As a result, naturally derived aggregate macroalgae are unfavorable for retailers because they are unable to keep up with customer demands and must be extra cautious of potential human-borne bacterial infection of the macroalgae. As such, plant retail businesses cannot maintain macroalgae in its aggregate ball form in stock despite growing commercial demand.

Therefore, what is needed is a host device that is designed to replace the infection-susceptible dead cell core of aggregate form macroalgae with an adherable substrate, thus leading to faster and more prolific plant growth.

SUMMARY

Some embodiments of the present disclosure include a host device for macroalgae cultivation that may replace the infection-susceptible dead cell core of aggregate form macroalgae. The host device may include a kernel comprising a lightweight, porous, and non-toxic material; a plurality of loops and pores on an outer surface of the kernel; and macroalgae filaments woven into the plurality of loops and pores.

BRIEF DESCRIPTION OF THE FIGURES

The detailed description of some embodiments of the invention is made below with reference to the accompanying figures, wherein like numerals represent corresponding parts of the figures.

FIG. 2 is a flow chart describing use of one embodiment of the present disclosure.

DETAILED DESCRIPTION

Figure 1:
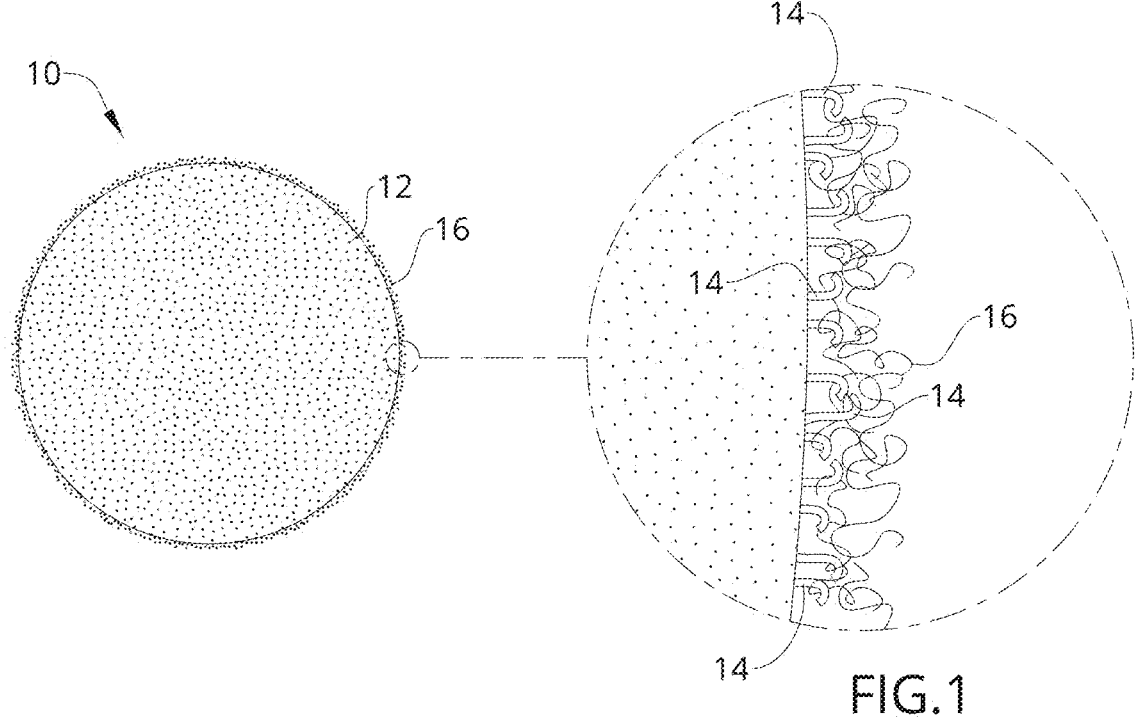
FIG. 1 is a schematic view and detailed view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as host device for aggregate form macroalgae and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

By way of example, and referring to FIG. 1, some embodiments of the present disclosure include a host device 10 for macroalgae cultivation, the host device 10 comprising a kernel comprising a lightweight, porous, and non-toxic material; a plurality of loops 14 and pores 12 on an outer surface of the kernel; and macroalgae filaments 16 woven into the plurality of loops 14 and pores 12.

In embodiments, the kernel of the present disclosure may be the foundation for the macroalgae to adhere and grow on, and it may replace the infection-susceptible dead cell core of the aggregate form macroalgae, providing a stable and clean surface for growth. More specifically, the kernel may be made from micro polypropylene fibers formed into spheres, such as dense spheres, wherein the outer surface is porous and wherein micro polypropylene fibers are lightweight, porous, and non-toxic. In some embodiments, a dense sphere may be a sphere where, for each square centimeter of surface area, about 0.1 to about 0.2 grams, such as about 0.17 grams, of macroalgae filaments may be present. The kernel may be sized to mimic the size and shape of the natural macroalgae core, maintaining the commercially attractive aggregate-like shape. The plurality of pores 12 on the outer surface of the kernel may facilitate the secure attachment and growth of the macroalgae, allowing it to grow in its desirable aggregate-like form. The loops 14 may serve as anchor points to aid in the adherence of the macroalgae to the kernel, wherein this mechanism of adherence may ensure the success of the cultivation process. The kernel may be created using any suitable methods such as injection molding or 3D printing to form the porous kernel. More specifically, the kernel may be created using micro polypropylene fibers, which are lightweight, porous, and non-toxic, wherein the fibers are formed into shapes through methods, such as injection molding or 3D printing. The formation process may ensure that the kernel has a robust structure suitable for the attachment of macroalgae filaments.

As mentioned above and as described in FIG. 2, algae filaments 16, which may be mostly straight, may be woven into the loops 14 and pores 12 on the surface of the kernel, which may ensure a secure attachment. The algae filaments 16 may be woven either manually or through an automated system, providing an even distribution of filaments across the surface of the kernel. The attachment may be facilitated by the porous nature of the kernel material, which may allow the filaments to grow and adhere naturally.

Once the algae filaments 16 are attached to the kernel, the host device 10 may be placed into a controlled growth environment, which may provide optimal light, temperature, and nutrient conditions for the macroalgae to thrive. Regular monitoring and adjustments may be made to maintain the ideal conditions, promoting faster and more prolific growth of the algae. During the growth process, the macroalgae-covered kernel may be regularly monitored for any signs of bacterial infection or other growth issues. If any problems are detected, appropriate measures may be taken to address them, ensuring the health and vitality of the macroalgae. In some embodiments, introducing an antibacterial agent during the cultivation process may further protect the macroalgae from bacterial infection, ensuring healthier growth. Similarly, nutrients may be directly infused into the host device to stimulate faster and more prolific growth of the macroalgae. Moreover, in some embodiments, an automated monitoring system may be used to monitor the macroalgae's growth conditions to help optimize its development.

If desired, once the macroalgae has grown sufficiently on the buoyancy kernel, it may be carefully harvested and prepared for sale. Alternatively, the macroalgae ball may be sold pre-harvesting, wherein a consumer may choose to harvest the algae. Either way, the harvested macroalgae ball may maintain its attractive aggregate-like shape, making it an appealing product for consumers.

Using the host device 10 of the present disclosure may allow macroalga suppliers the ability to accelerate the production of aggregate-like forms of algae from years to just days, because use of the host device 10 significantly reduces growth time and increases the hardiness of the naturally-derived aggregate macroalgae by removing the infection-prone core and transforming its morphology into the more prolific epilithic form.

While various intended uses are envisioned, in some embodiments, the host device of the present disclosure may be used in the aquarium and aquascaping industry, in biofuel production, in bioremediation, and the like. For example, the host device may provide for enhanced aquascaping by creating an attractive and stable macroalgae formation to providing an appealing and biologically beneficial addition to home or public aquariums, wherein macroalgae can help improve water quality by absorbing excess nutrients and providing oxygen. The host device of the present disclosure may be used to cultivate macroalgae specifically for maintaining water quality in fish tanks and aquaculture systems. In another embodiment, the hose device may be adapted to cultivate fast-growing algae species for biofuel production. By providing a stable and efficient growth environment, the host device may help accelerate the cultivation of algae biomass for renewable energy sources. In yet further embodiments, the host device may be used to grow macroalgae that absorb heavy metals, toxins, and other pollutants from water, making it suitable for bioremediation projects aimed at cleaning polluted water bodies.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A host device for macroalgae cultivation, the host device comprising:
   a kernel comprising a lightweight, porous, and non-toxic material, wherein the kernel is spherical;
   a plurality of loops and pores on an outer surface of the kernel, wherein each loop of the plurality of loops truncates at a hook portion spaced from the outer surface of the kernel; and
   macroalgae filaments woven into the plurality of loops and pores.

2. The host device of claim 1, wherein the kernel comprises micro polypropylene fibers formed into a dense sphere.

3. A method for creating a host device for macroalgae cultivation, the method comprising:
   forming a lightweight, porous, and non-toxic material into a dense sphere, creating a kernel with a plurality of loops and pores on an outer surface thereof, wherein the kernel is spherical; and
   weaving macroalgae filaments into the plurality of loops and pores, wherein:
      each loop of the plurality of loops truncates at a hook portion spaced from the outer surface of the kernel.

4. The method of claim 3, wherein the lightweight, porous, and non-toxic material comprises micro polypropylene fibers.

5. The host device of claim 1, wherein the plurality of loops extend various distances from the outer surface of the kernel.

6. The method of claim 3, wherein using the host device prevents infection in aggregate macroalgae growth.

* * * * *